United States Patent Office 3,062,833
Patented Nov. 6, 1962

3,062,833
PROCESS FOR THE PRODUCTION OF 4,5-DICHLORO-1,2-DITHIOLE-3-ONE
Friedrich Boberg, Misburg, near Hannover, and Georg Richard Schultze, Hannover, Germany, assignors to Chemische Werke Albert, Wiesbaden-Biebrich, Germany, a corporation of Germany
No Drawing. Filed Feb. 12, 1960, Ser. No. 8,220
Claims priority, application Germany Feb. 14, 1959
8 Claims. (Cl. 260—327)

This invention relates to the production of novel intermediates and a novel dithiole suitable for use as a fungicide, a pesticide or an oil additive.

It has been found that one obtains the hitherto unknown 4,5-dichloro-1,2-dithiole-3-one, if one reacts heptachloropropane, or hexachloropropene derived from heptachloropropane by splitting off hydrogen chloride, or a hexahalopropene containing both chlorine and fluorine such as 1,1,1-trifluoro-2,3,3-trichloropropene with elementary sulfur, or with an inorganic or organic sulfur chloride of the formula R—SCl in which R represents Cl, SCl, $CH_2Cl$, $CHCl_2$ or $CCl_3$. In the reaction, it is believed intermediate products are formed which are converted into the final product by hydrolysis. The reaction can be carried out in the presence of a Friedel-Crafts type catalyst at a temperature ranging from room temperature to about 120° C. or, in the absence of such catalysts, with sulfur at 160° C. or above, preferably at about 200° C.

A specific theory of the nature of the invention, or of a specific reaction, is not necessary to an understanding of the invention and it will be understood that the invention is not dependent thereupon. Yet the following equations and formula representing the reaction between hexachloropropene and sulfur will facilitate an understanding of the invention

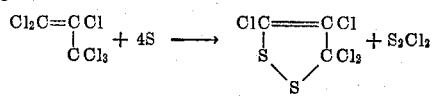

Hexachloropropene (I)   3,3,4,5-tetrachlor-1,2-dithiole

The hydrolysis of (II) leads to a further intermediate (III) and the end-product 4,5-dichloro-1,2 dithiole-3-one (IV)

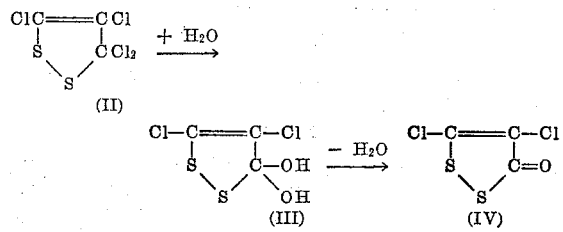

In a special procedure, the reaction product of hexachloropropene and sulfur is first extracted with methanol or another alcohol. A low molecular weight alcohol normally is used for there is no advantage in using high molecular weight alcohols. In this way, acetals (V) are formed which, when poured in water, hydrolyze into final product (IV) without passing through the intermediate hydrolysis phase (III)

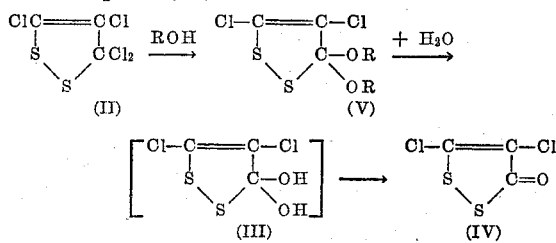

Reaction with elementary sulfur runs the most favorably in the range around 100° C. when using Friedel-Crafts catalysts.

Thus, the basic materials of the process of this invention are the aforementioned halogenated propanes and propenes and the sulfur compounds including elemental sulfur and the inorganic and organic sulfur compounds mentioned above. As stated, the organic sulfur compounds include, in addition to the inorganic sulfur compounds, chloromethyl- and dichloromethyl sulfur chlorides and also perchloromethyl mercaptan. In the place of the isolated sulfur chlorides one can also use the mixture of a chlorination product, resulting from the chlorination of carbon disulfide which contains disulfur dichloride and perchloromethyl mercaptan ($Cl_3CSCl$). Also, one can use the mixture of sulfur chlorides and chlorinated methanes obtained by the chlorination of the asymmetric compound $\alpha,\alpha,\alpha,\alpha'$-tetrachloro-dimethylsulfide.

Suitable Friedel-Crafts catalysts are, for instance, $AlCl_3$, $FeCl_3$ or $SbCl_5$. In the presence of these catalysts the reaction often takes place on mixing the basic materials at normal temperature. Cooling is necessary in certain cases and mild heating in other instances. As stated, if the reaction is carried out with elementary sulfur in the absence of catalysts, normally temperatures above 160° C. are most advantageous such as, for instance, temperatures of about 200° C.

Complex compounds, not mentioned in the above discussion, which develop as intermediates when using the Friedel-Crafts catalyzers, can be decomposed either immediately with water or with alcohols with the formation of intermediate acetals. The extraction with alcohols has the advantage that in this way grease-like, not more closely defined, by-products remain undissolved. Where using Friedel-Crafts catalysts, hydrochloric acid may be introduced into the reaction medium to inhibit the production of oxide hydrates. In addition, hydrochloric acid inhibits the formation of emulsion when sulfur chlorides are used as a reactant. When aluminum chloride is used as a catalyst, the reaction mixture, after conversion with sulfur, can be hydrolyzed with cold water.

Chlorinated methanes and hexachloroethane also develop as by-products. The 4,5-dichloro-1,2-dithiole-3-one can be separated from the by-products in a purified state by distillation and recrystallization, suitably from benzene or hydrocarbon fractions containing benzene or like hydrocarbon solvents.

The 4,5-dichloro-1,2-dithiole-3-one can serve effectively as an active insecticide or pest control agent. If desired, it can be mixed with known diluents or extenders or with other compatible insecticides. It also constitutes a valuable additive for mineral oils.

The following examples illustrate representative processes for preparing the novel compound of this invention having the properties mentioned above.

*Example 1*

Into a reaction vessel with a mounted "Dimroth" condenser, which was closed by a removable drying tube, was introduced a mixture of 80 g. hexachloropropene and 42 g. sublimed anhydrous aluminum chloride. One hundred ten (110) g. of perchloromethyl mercaptan were added to this mixture gradually through the reflux condenser while the reaction vessel was being agitated. The reaction started slowly and the reaction vessel was cooled with water to prevent the transformation from proceeding too violently. Two liquid layers formed. The lower layer was dark brown and oily and the upper layer was water-clear. On cooling, the lower layer became crystalline. After the principal reaction was over, heat was applied for another half hour to a water bath for the reflux condenser.

Subsequently the reaction mixture was heated to 100° C. at a 12 mm. vacuum in a distillation apparatus until hexachloroethane began to separate in the condenser. A deeply cooled trap (−30° to −40° C.) was inserted between the receiving vessel and the pump. An orange colored distillate distilled over, from which 75 g. of carbon tetrachloride was obtained by washing with sodium hydroxide and by further distillation.

A mixture of 50 cc. concentrated hydrochloric acid and 50 cc. water was gradually added to the distillation residue. After a violent decomposition reaction was completed, the reaction mixture was heated for another half hour on a boiling water bath. The reaction product was absorbed in carbon tetrachloride. Other organic solvents could be used. After distilling off the solvent, the residue was distilled under a 12 mm. vacuum, whereby 50 g. distilled over which solidified for the most part in crystalline form.

After recrystallization in 80 cc. gasoline, 33 g. of pure 4,5-dichloro-1,2-dithiole-3-one with a melting point of 59–60° C. was obtained. After further recrystallization, the melting point rose to 61° C.

In conformity with the theoretical formula for the stated dithiole, the empirical formula should be $C_3OCl_2S_2$ with a molecular weight of 187.1. The calculated and found proportions of C, O, Cl and S were as follows.

Calculated: C, 19.27; O, 8.56; Cl, 37.9; S, 34.3. Found: C, 19.30; O, 8.90; Cl, 37.5; S, 34.3.

Example 2

To a mixture of 40 g. hexachloropropene and 21 g. anhydrous aluminum chloride were added, as in Example 1, 48 g. dichloromethyl sulfur chloride. The transformation proceeded more violently than in the corresponding reaction with perchloromethyl mercaptan. After processing as described in Example 1, a 25 g. fraction, consisting mostly of chloroform, was accumulated from boiling point$_{25}$ 50–135° C. After recrystallization from 40 cc. gasoline, one obtained from the second fraction 18 g. 4,5-dichloro-1,2-dithiole-3-one representing 60% of the theoretical yield.

Example 3

Forty (40) g. hexachloropropene and 26 g. anhydrous ferric chloride were reacted, as in Example 2, with dichloromethyl sulfur chloride.

After recrystallization from gasoline, 9 g. 4,5-dichloro-1,2-dithiole-3-one was obtained representing 30% of the theoretical yield.

Example 4

To a mixture of 100 g. hexachloropropene and 53 g. anhydrous, finely sublimed aluminum chloride, was added 27 g. disulfur dichloride. The mixture was heated slowly until a reaction started at about 80° C. The beginning of the reaction was recognized by the presence of escaping hydrogen chloride. After the principal reaction was completed, the reaction mixture was heated for an additional hour on a water bath on the reflux cooler and then the reaction mixture was processed as in Example 1. Eighteen (18) g. of carbon tetrachloride and 68 g. of a fraction from boiling point$_{11}$ 110–120° C. was accumulated. From the second fraction one obtained through fractional crystallization from gasoline 30 g. of 4,5-dichloro-1,2-dithiole-3-one and 22 g. of hexachloroethane.

Example 5

Into 152 g. carbon disulfide and 0.1 g. iodine, dry chlorine was introduced at a rate such that the temperature did not rise over 25° C. After a weight increase of 385 g. had been effectuated, the transposition was interrupted. Twenty-eight (28) g. of the obtained chlorination mixture were then added to a mixture of 40 g. hexachloropropene and 21 g. anhydrous aluminum chloride and the reaction mass were heated slowly until reaction set in. The reaction mixture was then processed as in Example 1. After recrystallization from gasoline, one obtained 10 g. of pure 4,5-dichloro-1,2-dithiole-3-one representing 33% of the theoretical yield and, in addition, hexachloroethane.

Example 6

To 40 g. hexachloropropene and 21 g. anhydrous aluminum chloride were added 10 g. sulfur. The mixture was then slowly heated on an oil bath. At 70° C. the reaction sets in. Subsequently a temperature of 100° C. was maintained for one more hour. Then, proceeding as described in Example 1, one obtained 16 g. recrystallized 4,5-dichloro-1,2-dithiole-3-one having a melting point of 60° C. and representing 53% of the theoretical yield.

Example 7

Forty-six (46) g. heptachloropropane, 21 g. anhydrous aluminum chloride and 20 g. sulfur were caused to react as in Example 6 and then processed as described therein. The yield of recrystallized 4,5-dichloro-1,2-dithiole-3-one was 3 g. representing 10% of the theoretical yield.

Example 8

To a mixture of 40 g. hexachloropropene and 56 g. perchloromethyl mercaptan was added 50 g. antimony pentachloride. A yellow firm reaction product was obtained. The reaction mixture was heated for two hours in the reflux condenser to 100° C. and then at a heating bath temperature of 150° C. in a descending condenser while applying a water jet vacuum. The residue in the vessel was heated for one hour in a reflux condenser with 50 cc. water and 50 cc. of concentrated hydrochloric acid. The organic reaction product was absorbed in carbon tetrachloride and distilled in the manner described in the preceding examples. Twenty-seven (27) g. of distillate resulted which was partially crystallized. After recrystallization from 15 cc. gasoline, one obtained 9 g. pure 4,5-dichloro-1,2-dithiole-3-one representing 30% of the theoretical yield.

Example 9

Eighteen (18) g. of 1,1,1-trifluoro-2,3,3-trichloropropene were heated in a reflux condenser with 13 g. of aluminum chloride and 12 g. sulfur for one hour. After proceeding as described in Example 1, one obtained in the end 7 g. of distillate, of boiling point$_{11}$ 90–130° C. After recrystallization from 15 cc. gasoline, the yield was 3 g. 4,5-dichloro-1,2-dithiole-3-one representing 18% of the theoretical yield.

Example 10

Eighteen (18) g. of 1,1,1-trifluoro-2,3,3-trichloropropene, 34 g. of perchloromethyl mercaptan and 13 g. aluminum chloride were brought to reaction as in the previous example. The yield was 3 g. 4,5-dichloro-1,2-dithiole-3-one representing 18% of the theoretical yield.

Example 11

Fifty (50) g. hexachloropropene and 20 g. sulfur are heated for 9 hours to 200–210° C. on an oil bath in a reflux condenser whereby refluxing soon takes place. After the disulfur dichloride that has developed has been distilled off in a vacuum at 12 mm. (yield: 18 g.), 100 cc. methanol is added to the solid residue. When heating on a water bath violent boiling soon takes place. One boils for fifteen minutes in a reflux condenser, decants the warm methanol extract and again boils the cloudy residue with 50 cc. methanol. The combined methanol extracts are poured into 200 cc. water. A red-brown oil precipitates which is incorporated in methylene chloride and is then distilled (boiling point 90–135° C./11 mm.). The distillate crystallizes when standing overnight; it is recrystallized from 10 cc. gasoline. Yield: 8.5 g. 4,5-dichloro-1,2-dithiole-3-one with a melting point of 59–60° C. After further recrystallization, the melting point rises to 61° C.

From the preceding examples, it will be apparent that the reactions hereof take place in the presence of the Friedel-Crafts catalyst, for the most part, merely upon admixing the halogenated propane, or halogenated propene, with the sulfur compound although heating may be applied toward the end of the reaction to induce the reaction to go to completion. Thus an important yield is obtained merely by mixing the reactants and the catalyst. On the other hand, modified reaction conditions may be maintained by cooling the reaction mass to moderate the reaction or by heating it to mildly elevated temperatures, ordinarily below 100° C., to speed up the reaction. Thus under any circumstances, the reactants react in the presence of the catalyst at mild temperatures.

When elementary sulfur is used in the absence of catalysts, temperatures of 160° C., and above, are required.

The hydrolysis reaction is exothermic and takes place merely by mixing the intermediate reaction product and water. When catalysts are used, a strong acid, typically a strong mineral acid such as hydrochloric acid, is used together with water for the reasons stated above.

It should be understood that the present invention is not limited to the details herein given but extends to all kindred materials, procedures and conditions of reaction which will occur to those skilled in the art upon consideration of the teachings herein and the scope of the appended claims.

What is claimed is:

1. A process for producing 4,5-dichloro-1,2-dithiole-3-one which comprises reacting in intimate admixture with a Friedel-Crafts catalyst (A) a substance selected from the group consisting of heptachloropropane, hexachloropropene, and 1,1,1-trifluoro-2,3,3-trichloropropene and (B) a sulfur substance selected from the group consisting of (a) sulfur, and (b) a sulfur chloride of the formula R—SCl wherein R represents a radical selected from the group consisting of Cl, SCl, $CH_2Cl$, $CHCl_2$ and $CCl_3$ and admixtures of (a) and (b) and hydrolyzing the formed product with an acid in an aqueous medium.

2. The process of claim 1 in which the sulfur substance is a sulfur chloride comprising the mixture of chlorination substances obtained by the chlorination of carbon disulfide.

3. The process of claim 1 in which the sulfur substance is a sulfur chloride comprising the mixture of chlorination substances obtained by the chlorination of $\alpha,\alpha,\alpha',\alpha'$-tetrachlorodimethylsulfide.

4. A process for producing 4,5-dichloro-1,2-dithiole-3-one which comprises reacting (A) a substance selected from the group consisting of heptachloropropane, hexachloropropene, and 1,1,1-trifluoro-2,3,3-trichloropropene and (B) a sulfur substance selected from the group consisting of (a) sulfur, and (b) a sulfur chloride of the formula R—SCl wherein R represents a radical selected from the group consisting of Cl, SCl, $CH_2Cl$, $CHCl_2$ and $CCl_3$ and admixtures of (a) and (b) in intimate admixture with a Friedel-Crafts catalyst at a temperature between 20 and 150° C. and hydrolyzing the formed product with an acid in an aqueous medium.

5. A process for producing 4,5-dichloro-1,2-dithiole-3-one which comprises heating and reacting at a temperature above 160° C. hexachloropropene and sulfur and hydrolyzing the formed product with an acid in an aqueous medium.

6. A process for producing the novel compound 4,5-dichloro-1,2-dithiole-3-one which comprises reacting (A) a substance selected from the group consisting of heptachloropropane, hexachloropropene, and 1,1,1-trifluoro-2,3,3-trichloropropene and (B) a sulfur substance selected from the group consisting of (a) sulfur, and (b) a sulfur chloride of the formula R—SCl wherein R represents a radical selected from the group consisting of Cl, SCl, $CH_2Cl$, $CHCl_2$ and $CCl_3$ and admixtures of (a) and (b), reacting the formed product with water in an aqueous acid medium to form 3,3-dihydroxy-4,5-dichloro-1,2-dithiole and subjecting it to dehydration temperatures to form said novel compound.

7. A process for producing the novel compound 4,5-dichloro-1,2-dithiole-3-one which comprises reacting (A) a substance selected from the group consisting of heptachloropropane, hexachloropropene, and 1,1,1-trifluoro-2,3,3-trichloropropene and (B) a sulfur substance selected from the group consisting of (a) sulfur, and (b) a sulfur chloride of the formula R—SCl wherein R represents a radical selected from the group consisting of Cl, SCl, $CH_2Cl$, $CHCl_2$ and $CCl_3$ and admixtures of (a) and (b), extracting the formed 3,3,4,5-tetrachloro-1,2-dithiole with a low molecular weight alcohol to form 3,3-dialkoxy-4,5-dichloro-1,2-dithiole and hydrolyzing it with water to form said novel compound.

8. 4,5-dichloro-1,2-dithiole-3-one.

References Cited in the file of this patent

Spindt et al.: Journal of the American Chemical Society, vol. 73, pages 3693–3697.